United States Patent Office 3,476,566
Patented Nov. 4, 1969

3,476,566
FLAVOR IMPROVEMENT PROCESS FOR COFFEE
William V. White, Spring Valley, N.Y., and James P. Mahlmann, Wayne, and Robert P. Stolz, Dumont, N.J., assignors to General Foods Corporation, White Plains, N.Y., a corporation of Delaware
No Drawing. Filed Aug. 10, 1966, Ser. No. 571,382
Int. Cl. A23f 1/04
U.S. Cl. 99—65   5 Claims

ABSTRACT OF THE DISCLOSURE

It has been discovered that undesirable aroma components and gases can be removed from roasted coffee by adding moisture to the roasted coffee and allowing the coffee to equilibrate to a moisture content of from about 4% to 40% and then heating the coffee to vaporize at least some of the equilibrated moisture. It is important to allow the moisture to equilibrate in the coffee in order to avoid additional roasting. The process of this invention is found to improve coffee flavor as well as further processing of the coffee.

---

This invention relates to removal of undesirable aroma components and gases from coffee to thereby improve coffee flavor as well as further processing of the coffee.

It has been known that the carbon dioxide retained in the roasted bean is not fully released upon grinding and presents problems in both non-soluble (roasted and ground coffee) production and soluble coffee production. In packaging of roasted and ground coffee, the carbon dioxide retained in the bean is released slowly on storage, necessitating the use of strong containers which can withstand the increase in pressure while in soluble coffee production the carbon dioxide is released in the percolator columns presenting troublesome gas pockets and foam which hinder the extraction operation. Moreover, it is known that coffee contains certain harsh, tarry or earthy type of volatile notes which detract from the stability, flavor and aroma of coffee. Certain types of coffee, depending on the region and climate where harvested, contain a characteristically higher or lower level of these undesirable volatiles. It would be desirable if a simple and effective process were developed which could improve the flavor of all coffee beans regardless of the region where they are grown and harvested and which would also avoid the processing problems inherent in $CO_2$ retention in the beans.

It is an object to this invention to remove a substantial amount of carbon dioxide present in the coffee after roasting and prior to percolation by heating said coffee in the presence of sufficient moisture to release said $CO_2$.

Another object of this invention is to improve the flavor of roasted coffee, especially low-grade coffees of the Robusta variety, by removing objectionable tarry, earthy and bitter flavor notes due to application of moisture and heat to said roasted coffee.

Still another object of this invention is to improve the flavor of roasted coffee, especially coffee of the Robusta variety, by reacting or modifying the undesirable aroma components in the presence of heat and moisture to thereby change the flavor of these aroma components and then collecting these aroma components.

Other objects and advantages of this invention will be apparent upon a reading of the following description and claims.

This invention is founded on the discovery that the $CO_2$ content of all roasted coffee and the flavor of certain roasted coffees, such as Robustas, can be improved by heating the roasted coffee in the presence of between 4% and 40% by weight bean moisture; said moisture being sufficiently equilibrated throughout the coffee to contact, absorb, and/or react with the gases and aromas present in said coffee while, at the same time, preventing roasting of the coffee, and then vaporizing at least some of the equilibrated moisture.

Essentially, this invention involves contact of added moisture with objectionable aroma and gas components from the interior portions of the bean and the use of heat to physically alter, chemically react or merely volatilize the moisture and any absorbed gases and aromas from said coffee.

To prevent further roasting of the beans during the heating step of this invention, it has been found necessary to have at least a 4% moisture, preferably 6%, present in the coffee beans throughout the heating step. In order to assure this moisture content in the coffee during heating, it is best to add between 5% and 35% by weight of water to the roasted coffee thereby raising the moisture content of the coffee to between 10% and 40%. This added moisture may be added to the coffee during the normal quenching operation (which terminates roasting of the coffee) or may be added as a separate operation after the roasted coffee has cooled to ambient temperature (70° F.). It is preferred to add a sufficient amount of water to raise the moisture content of the beans to 10–40%, preferably to between 15% and 20%. It has been found that beneficial results in regard to $CO_2$ removal and upgrading of base coffee flavor are still attained by application of heat alone to the roasted coffee as long as the roasted coffee has a moisture content above 4%, say 6–10%, in the interior portions of the bean and care is taken not to roast the beans during the heating step.

Since an essential feature of this invention is the entry or absorption of the added moisture into the interior portions of the roasted coffee bean (whether the bean is in whole or subdivided form) so that the moisture can displace, absorb, or react with any undesirable gases and aromas present in said interior portions, it is understood that the added moisture can be allowed to slowly enter the beans and be uniformly distributed therein (equilibration) via a tempering step under ambient conditions or via a more accelerated step wherein the moisture is driven into the beans by application of heat and superatmospheric pressure (the wet coffee being subjected to heat and moisture in a closed zone to develop a pressure of between 15 and 50 p.s.i.g.).

When tempering is used to equilibrate the bean moisture, the tempering time will vary with the charge of roasted coffee, temperature of the coffee, amount of moisture added, temperature of the water, and other variables. Generally, it has been found that under ambient conditions a period of 1 to 2 hours is sufficient to uniformly distribute the added moisture throughout the coffee and thereby expel or absorb a substantial portion of the $CO_2$ and undesirable volatiles present in the coffee. Under certain conditions a 15 minute retention time is sufficient. Retention times of 10 to 20 hours are effective but no increase in beneficial results over 2 hours is attained and retention times in excess of 24 to 30 hours will tend to produce some flavor degradation in the beans which will increase with the time of tempering.

When an accelerated equilibration is used, the application of heat and water must be applied to the beans in a closed chamber which develops a superatmospheric pressure which serves to drive the added water into the interior portions of the coffee bean. This can be done by prewetting the coffee to the desired moisture level (say 15–20%), placing the moistened beans in a confined vessel, closing the vessel, applying external heat to the moistened coffee until the pressure is above atmospheric (say 30 p.s.i.g.) and then holding the coffee at this pressure for 15 seconds to 10 minutes to obtain the flavor improvement. The vessel is then opened and the equilibrated moisture is allowed to flash off, thus lowering the moisture content of the coffee to between 4–8%. Alternatively, the roasted coffee can be placed in dry form into a confined vessel, the vessel closed, and steam inserted into the closed chamber to develop the superatmospheric pressure and introduce moisture into the coffee, the steam is then stopped and the moistened coffee is held for a short time to upgrade the flavor. This can be done by using a satured steam atmosphere in a closed chamber. Moisture equilibration can then be achieved in less than 2 minutes and in as short a time as 15 to 60 seconds. The beans can then be dried to a stable moisture content if the bean moisture is too high for further processing.

Whether the beans have been tempered under ambient conditions or are to be tempered simultaneously with the application of heat, heating of the roasted coffee for periods of between 15 seconds and 10 minutes (preferably about 2 to 5 minutes) at product temperatures of between 200° and 350° F. will be necessary in order to achieve a significant upgrading in flavor. It is understood that the equilibrated moisture when vaporized from the coffee may be merely discarded or, in certain cases, it may be desirable to collect and use these vapors as a separate aroma source. However, the essential feature of this invention is the ability of the heat treatment (in the presence of 10% to 40% equilibrated moisture) to remove entrained gases from all coffees and to upgrade the base coffee flavor of inferior coffees, such as low-grade Robustas, or of better quality coffees which have deteriorated during storage or shipment.

This invention will now be described by reference to several specific examples.

EXAMPLE I

Two roasts of Robusta coffee (low-grade Indonesian), each having an initial moisture content of about 6%, were carried out.

In one roast, a control roast representative of current commercial roasting practice, was conducted. A 400-gram charge of green coffee beans was charged into a one-pound roaster comprising a cylinder with means for agitating the beans during roasting. The cylinder was adapted to be heated by indirectly heated hot air passing through it. The beans were tumbled in the roasting cylinder for about 15 minutes while hot air at a temperature of about 500° F. was circulated through the tumbling coffee. At the end of this time period, the beans had achieved the desired degree of roast for optimum product quality and the roasted coffee was air quenched and set aside for evaluation.

In the second roast, a 400-gram charge of the Robusta beans was introduced into the same roasting cylinder and roasted for the same period of time but instead of the air quench used in the control about 300 ml. of water was used to quench the beans and raise the moisture content of the beans from 2% to about 20% by weight water.

The quenched beans were allowed to temper for 1 hour at room temperature. At the end of this period of time, the tempered beans were placed between screens having an area of about 2 sq. ft. on each side and a bed thickness of about 2″. The volume of beans in the charged screens had a volume of 0.3 cubic feet. The product was dried by heated air at a temperature of about 425° F. passing the bed at a velocity of about 70′ per minute. This reduced the moisture content of the beans from about 20% to 2% in 90 seconds. The coffee had a product temperature of 220° F. at this point. Comparison of the quenched product with the control revealed a reduction in the $CO_2$ level of the quenched beans of more than 75% compared to the control and a significant reduction in the bitter and tarry flavor notes of the percolated extract as compared to the control.

Similar samples tempered for periods of 4, 8 and 16 hours gave the same results as above. However, Robusta coffee which was tempered for about 24 hours was found to experience some degradation in flavor in the percolated extract as compared to the control.

EXAMPLE II

Roasted Robusta coffee beans (Indonesian variety) were ground to a coarse size wherein 90% of the coffee was retained on a 20 mesh U.S. Standard Sieve screen and the coffee prewet with 15% moisture to raise the total moisture content of the coffee to 18%. The coffee was tempered for 2 hours at ambient conditions to equilibrate the moisture throughout the ground beans and then fed to a preheated metal barrel (having a barrel temperature of 450° F.) equipped with a screw conveyer 1″ in diameter and 8″ in length. The coffee was fed at a rate of 1.5 lbs. per hour. Residence time in the heated barrel was 80 seconds. In this time, product temperature of the coffee was raised to above 200° F. for at least 15–30 seconds (exit temperature of the coffee was about 230° F.) and the moisture content was reduced to about 5%.

This product showed a similar upgrading in flavor and $CO_2$ reduction as the products of Examples 1 and 2.

EXAMPLE III

Roasted whole Robusta beans (2000 grams) of the low-grade Indonesian variety (roasted at 400° F. for about 18 minutes to achieve a normal roast color and quenched with the normal amount of water to terminate roasting) having a moisture content of 7% were placed in a pressure vessel equipped with external heating coils. About 200 ml. of water was added to the coffee to thereby raise the total moisture content of the coffee to about 18% on a weight basis. The vessel was then closed, the beans mixed with the water by means of an agitator arm, and the chamber heated externally until a pressure of 30 p.s.i.g. was developed within the chamber. At this point, the product temperature of the coffee beans was estimated to be between 230° and 260° F. The heat was then shut off, the coffee was held at this pressure for 2 minutes and the chamber immediately opened to atmosphere to flash off the equilibrated moisture. Product temperature of the coffee at this point was about 220° F. and moisture content of the coffee was about 6% by weight.

This product showed an upgrading in base flavor in regard to the tarry and earthy flavor notes and a $CO_2$ reduction similar to the Example I product.

EXAMPLE IV

A cylindrical pressure vessel having a height of 13 feet and a width of 10 inches was preheated prior to introduction of the coffee charge by injecting steam into the closed vessel for about 10 minutes until the temperature of the vessel walls reached 350° F. The vessel was then opened, vented to atmosphere and a 100 pound charge of roasted Robusta coffee (Indonesian variety) having a normal roast color and ground to a particle size wherein 97% of the coffee was retained on a 40 mesh U.S. Standard Sieve Screen) was placed inside the vessel. The vessel was closed but vented to the atmosphere by leaving the top valve open. Steam at 50 p.s.i.g. was passed through the coffee for 1 minute to purge any entrapped air, the valve closed and steaming was continued until a pressure of 35 p.s.i.g. was developed in the vessel. The steam was then shut-off and the coffee held at this temperature and pressure for 2 minutes. The vessel was then opened to the atmosphere and the vapors developed during the heat-pressure step were vented to the atmosphere.

This product, after being percolated and spray-dried, reconstituted to an improved or upgraded coffee flavor having less harsh, tarry or earthy flavor notes in comparison to the control samples which were not subjected to the heat-pressure treatment. This flavor improvement was even more pronounced when a brewed cup of coffee was made directly from the roasted and ground coffee and compared to a control sample not heat-treated after roasting.

While this invention has been described by reference to several specific examples, it is understood to be limited only by the scope of the appended claims.

What is claimed is:

1. A proces for removal of undesirable gases and objectionable flavor characteristics from roasted coffee which comprises prewetting said roasted coffee and equilibrating said roasted coffee to a moisture content of between 4% and 40% by weight of the moisturized coffee, said moisture being sufficiently equilibrated throughout the coffee to prevent further roasting of the coffee while contacting a substantial portion of the gases and aromas present in said coffee; heating said moisturized coffee under atmospheric conditions at a temperature of about 200 to 350° F. for between 15 seconds and 10 minutes in order to vaporize at least some of the equilibrated moisture.

2. The process of claim 1 wherein the roasted coffee is prewet to a moisture content of between 15% and 20% moisture, said moisture is equilibrated throughout the coffee, and the moisture content reduced to between 4% and 8% during the heating step.

3. The process of claim 1 wherein the added water and any aromas absorbed by said water when vaporized are discarded.

4. The process of claim 1 wherein the added water and any aromas absorbed by said water when vaporized are collected, concentrated to remove water, and then combined with soluble coffee solids.

5. The process of claim 2 wherein the additional water is added during quenching of the roasted coffee.

References Cited

UNITED STATES PATENTS 2,278,473  4/1942  Musher _____ 99—65

MAURICE W. GREENSTEIN, Primary Examiner

U.S. Cl. X.R.

99—71, 152